Dec. 30, 1969  R. C. SCOTT  3,486,373

LOAD MEASURING APPARATUS

Filed Sept. 26, 1968  2 Sheets-Sheet 1

INVENTOR.
ROBERT C. SCOTT
BY Kenway, Jenney & Hildreth
ATTORNEYS

United States Patent Office 3,486,373
Patented Dec. 30, 1969

3,486,373
LOAD MEASURING APPARATUS
Robert C. Scott, 340 Common St.,
Belmont, Mass. 02178
Filed Sept. 26, 1968, Ser. No. 762,922
Int. Cl. G01l 5/12; G01n 3/32, 3/44
U.S. Cl. 73—141  8 Claims

ABSTRACT OF THE DISCLOSURE

A variable range load measuring assembly for hardness testers and the like in which a hairpin type load spring is combined with means for selectivity coupling the spring to a load directly or through a load divider, and in which the load axis is unchanged when the load is coupled to the spring through the load divider.

---

My invention relates to load measuring, and particularly to a novel load spring assembly having a variable load measuring capacity.

My invention is particularly applicable to hardness testers, and specifically to hardness testing machines of the kind shown and described in U.S. Letters Patent Nos. 2,693,698, granted to me on Nov. 9, 1954, for Hardness Tester; 3,128,621, granted to me on Apr. 14, 1964 for Horizontal Hardness Tester; and 3,138,951, granted to me on June 30, 1964 for Portable Hardness Tester.

The indentation method for testing the hardness of materials, for which machines of the kind described above are adapted, comprises the indenting of test specimens by a penetrator of specified shape and material, to which a thrust or load of specified magnitude is gradually applied. The depth of penetration into the test specimen, which is a function of the hardness of the test specimen, is measured and converted to hardness numbers so chosen that the smaller the depth of penetration, and consequently the harder the test specimen, the greater the numerical value of the hardness number.

The particular indentation method of hardness testing normally used with the testers shown and described in the aforementioned patents requires the application of a "minor" load to the penetrator, to establish a reference point that minimizes inaccuracies due to surface imperfections in the test specimen. From that reference point, the depth of penetration by a "major" load is measured. The combination of minor load, major load, and type of penetrator used represents and defines different hardness scales, each of which is designated by a different letter of the alphabet. Hence, with a minor load of ten kilograms, a major load of either 60, 100, or 150 kilograms, and the use of a specific penetrator of which there are five types, a total of thirteen different hardness scales may be used, which are collectively designated as "Normal" hardness scales.

In similar manner, but with a minor load of three kilograms, a major load of either 15, 30 or 45 kilograms, and the use of a specific penetrator of which there are five types, a total of fifteen different additional hardness scales may be used, which are collectively designated as "Superficial" hardness scales. Thus, a total of twenty-eight different hardness scales are available, from which the optimum scale for a particular hardness test may be selected in dependence upon the kind and shape of material of the test specimen.

The aforementioned patents show and describe hardness testers that encompass a variety of overall designs and applications but which include similar means comprising a threaded spindle assembly for applying a load to the penetrator along the penetrator axis, and for measuring the resulting depth of penetration into the test specimen. The threaded spindle assembly includes means for preventing back-lash of the threaded elements thereof, and for maintaining axial alignment of the applied load along the penetrator axis.

A calibrated load spring providing elastic deflection with negligible hysteresis and drift for all values of loading is interposed between the threaded spindle assembly for applying the load to a penetrator extension rod. The selected penetrator is inserted into the penetrator extension rod. The extension rod is guided axially by oilless bearings, and is movable along the penetrator axis by the threaded spindle assembly in a gradual manner during the making of a hardness test, which allows the material of the test specimen to be evenly displaced by the penetrator and also protects the penetrator from damage during the initial application of the penetrator to a test specimen. The consruction and mode of operation of the testers are more fully described in the aforementioned patents, and therefore no further detailed description of them is believed necessary.

The primary object of this invention is to provide an improved indentation hardness tester of the kind shown and described in the aforementioned patents, by including means, integral with the tester, for readily extending the number and scope of hardness scales for which a single tester may be used for making hardness tests, in order that the total number of normal and superficial hardness scales heretofore described may be included, without the necessity of adding, subtracting, or substituting any part, component, or device to the tester either prior to or during the making of a hardness test, other than to insert the appropriate indentor or penetrator for the hardness scale used.

It is a feature of this invention that the means comprising an improved load spring assembly for extending the number of hardness scales that may be used by a single hardness tester provides incremental elastic deflections of the load spring for lower values of applied load that are approximately equal to the incremental elastic deflections of the load spring for higher values of applied load, thus providing approximately equal sensitivity of the load spring for all values of applied load.

Another feature of this invention is that all values of load applied to the improved load spring assembly are along the axis of the penetrator, which provides a balanced load along the axis of the penetrator for all values of loading.

Another feature of this invention is that the elastic deflection of the load spring is increased for the lower values of applied load, thus extending the number and range of predetermined load values that may be applied, by means including a lever cooperatively integral with the load spring and movable by finger pressure.

A further feature of this invention is that the means comprising the improved load spring assembly, or modifications thereof, may be embodied in other machines and devices for the measurement of loads and forces.

While the subject matter which I regard as my invention is particularly pointed out in the appended claims, it is believed that the invention will be more clearly understood from the following detailed description of a preferred embodiment thereof, referring to the accompanying drawings, in which:

Figure 2:
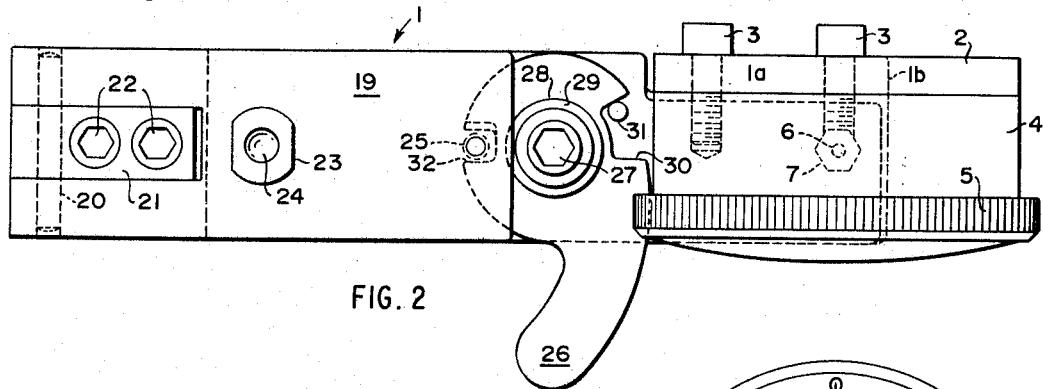
FIG. 2 is a top plan view of the improved load spring assembly.
Figure 1:
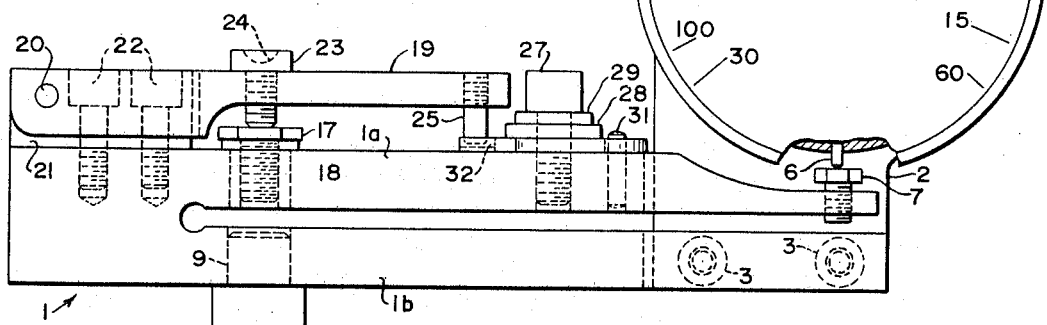
FIG. 1 is a view in side elevation of a preferred embodiment of the improved load spring assembly of my invention, adapted for use in a hardness testing machine.
Figure 1:
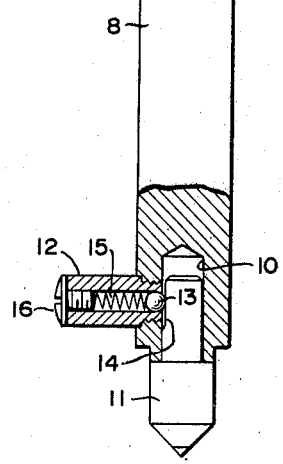

An improved load spring that has been developed by me for carrying out the aforementioned objects and found to work satisfactorily is illustrated in the drawings designated FIG. 1 and FIG. 2 and includes a longitudinally slotted type of hairpin compression spring 1. The spring 1 comprises a support portion in which upper and lower beams 1a and 1b, respectively, are cantilevered. I prefer to make the spring 1 of beryllium copper, suitably heat treated after fabricating and machining to provide elastic deflection with negligible hysteresis error and drift under maximum applied loads.

At the outer slotted end of the load spring, an indicator bracket 2 made of light-weight material such as aluminum alloy is securely fastened to the lower beam 1b by stainless steel machine screws 3. Clearance space is provided between the indicator bracket and the upper spring beam 1a to permit freedom of flexure of the spring beams. A sensitive dial indicator 4 having a rotatable bezel 5 for adjusting the dial position is securely fastened to the indicator bracket. A spring-loaded indicator spindle 6 perpendicular to the plane of the upper beam of the load spring rests firmly on the highly polished flat surface of a hardened steel button 7. The button 7 is threaded into the upper beam 1a of the load spring for adjustment of height. The button and dial indicator are so arranged that the slightest flexure of the load spring due to compression will cause the dial indicator pointer to turn in a clockwise direction and thus indicate the compression on the dial.

A penetrator extension rod 8, which I prefer to make of stainless steel hardened and polished after machining, is press-fitted into a reamed hole 9 in the lower beam 1b of the load spring. The outer end of the penetrator extension rod is provided with a reamed center hole 10 into which a penetrator 11 is secured in place by a retainer 12 comprising a hardened steel ball 13 through which pressure is applied to a flattened section 14 of the penetrator by a compression spring 15. The spring is retained by a set screw 16, all of which permits ready removal and replacement of the penetrator. The penetrator may be a sphero-conically shaped diamond, or a hardened steel ball of diameter depending upon the hardness scale used. On the upper beam of the spring and on the axis of penetrator extension rod 8, a hardened steel button 17 with a ground and highly polished flat surface is threaded into a stainless steel threaded sleeve 18. The sleeve 18 is press-fitted into a reamed hole in the load spring.

At the unslotted end of the load spring, comprising the support portion, a rigid stainless steel load equalizing beam 19 is hinged to the upper side by means of a hardened steel hinge pin 20 and a stainless steel hinge block 21 which is securely fastened to the load spring by stainless steel machine screws 22. The load equalizing beam is dimensionally constructed for negligible deflection for the maximum value of load applied, and is restrained from motion at quadrature to the normal motion provided by the hinge.

On the upper side of load equalizing beam 19 and on the axis of penetrator extension rod 8, a hardened steel button 23 is threaded into the beam. The upper face of the button is provided with a polished ball-shaped concave center 24 and the threaded end which extends through the beam is ground flat and dimensionally apportioned to rest firmly upon the flat surface of hardened steel button 17 when the plane of load equalizing beam 19 is parallel with the plane of the upper beam of the load spring.

At the unhinged end of the load equalizing beam 19, a stainless steel load pin 25 is threaded into a hole located on the longitudinal center and spaced so that the distance to the penetrator axis is equal to the distance from the hinge pin 20 to the penetrator axis. A stainless steel lever 26 with extended operating handle and ground and parallel surfaces is provided for interposition between the surface of the upper beam of the load spring and load pin 25, and is fastened to the load spring by a stainless steel machine screw 27, a flat washer 28, and a spring washer 29 to permit limited angular motion of the lever 26 by means of a recessed area 30 and a stainless steel stop pin 31 which is press-fitted into the upper beam 1a of the load spring.

A second recessed area 32 in lever 26 allows clearance for the load pin 25. The load pin 25 enters the recessed area 32 when the load equalizing beam 19 is in the lower position and the threaded extension of hardened steel button 23 rests on the flat surface of hardened steel button 17. The length of the load pin 25 is apportioned so that it will not make contact with the surface of the upper beam of the load spring when it enters the recessed area 32 of the lever 26, but will move the load equalizing beam 19 by means of its hinge to the upper position, and thus provide clearance space between the threaded extension of the hardened steel button 23 and the surface of the hardened steel button 17, when the lever 26 is turned by means of its operating handle and interposed between the load pin 25 and the upper beam of the load spring. The face of the load pin 25 is ground flat with a beveled edge to provide sliding action with the surface of the lever 26, and the lever 26 is cooperatively beveled on its upper edge. These bevels facilitate movement of the lever 26 between its interposed and its non-interposed positions when it is turned by finger pressure through the restricted angle permitted by the pin 31.

The equal spacing from the penetrator axis to the hinge pin 20 and to the load pin 25 on the load equalizing beam 19 equalizes the loading on the hinge pin 20 and the load pin 25, and provides a balanced load along the axis of the penetrator extension rod 8 for all values of normal and superficial loading.

Spacing of the load pin 25 from the penetrator axis is apportioned so that the maximum elastic deflection of the load spring 1 resulting from the maximum values of applied loading for both the Superficial and Normal hardness scales is approximately equal.

By moving the operating handle of the lever 26 on the load spring to its extreme position in the direction of the dial indicator 4, the load equalizing beam 19 will be "hinged" to the upper position, which will divide the applied loading in its application to the spring between the hinge pin 20 and the load pin 25, whereby values of applied loading for the Superficial hardness scales will be indicated by appropriate markings on the dial of the dial indicator 4. Also by moving the operating handle of the lever 26 on the load spring to its extreme position in the opposite direction, the load equalizing beam 19 will be moved to the lower position so that the total loading will be applied to the spring directly along the penetrator axis, and values of applied loading for the Normal hardness scales will be indicated by appropriate markings on the dial of the dial indicator 4. Hence, by moving the operating handle of the lever 26 through its limited angular motion, hardness scales for both Superficial and Normal groupings may be readily selected. While the setting of the lever 26 thus affects the sensitivity of the indicator by dividing the application of the load to the spring, the total load in each case is transmitted to the penetrator.

The load spring assembly of FIGURES 1 and 2 is directly adapted for use in the machine shown in the above cited U.S. Patent No. 3,128,621, in which it will replace the load spring 20 and its appurtenances. Suitable mounting fittings, as shown in FIG. 6 of the patent, may be provided as described therein.

Figure 4:
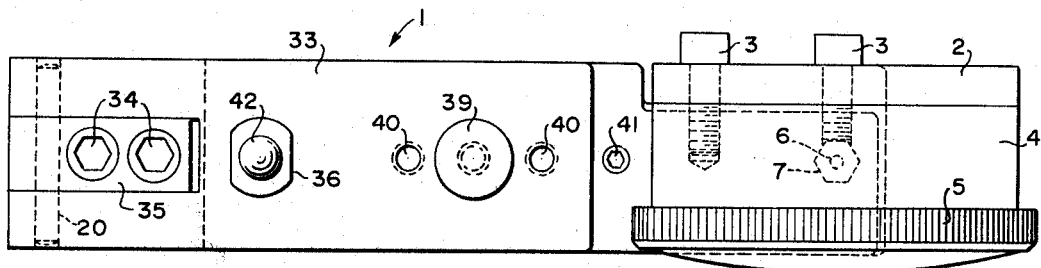
FIG. 4 is a partial top plan view of the modified load spring assembly of FIG. 3.
Figure 3:
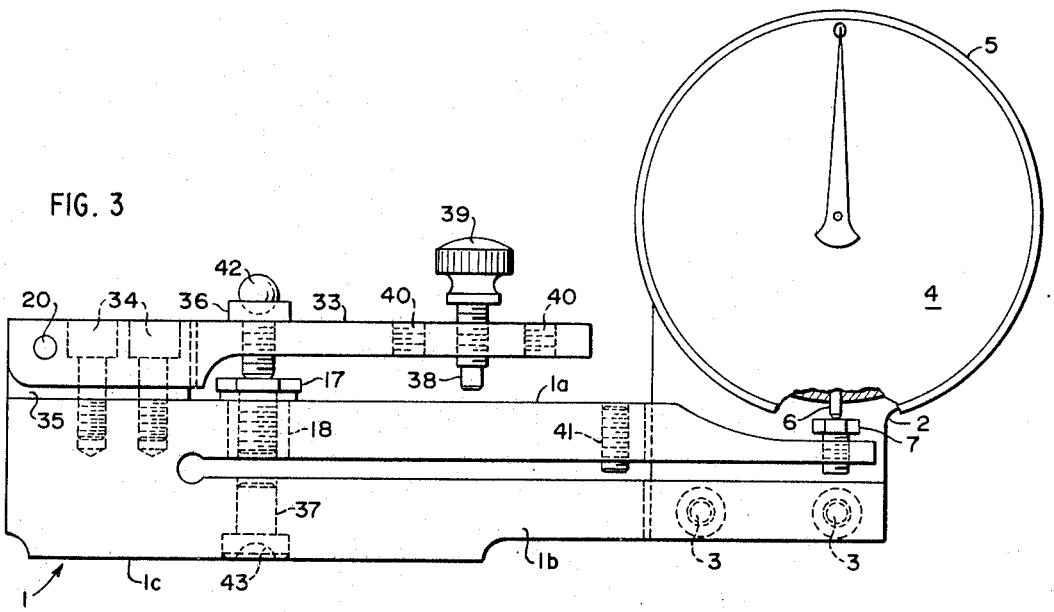
FIG. 3 is a view in side elevation of a modified embodiment of the load spring assembly of my invention, adapted for the measurement of loads and forces.

A modification of the improved load spring assembly that may be embodied in machines or devices for measuring compressive loads, by being interposed between two centers, between a center and a plane surface, or between two plane surfaces, is illustrated in the drawings in FIG. 3 and FIG. 4 and includes a longitudinally slotted type of hairpin compression spring 1 with upper and lower beams 1a and 1b made of spring material with physical characteristics that provide elastic deflection with negligible hysteresis error and drift under maximum applied loads. At the outer slotted end of the load spring, an indicator bracket 2 is securely fastened to the lower beam by machine screws 3. Clearance space is provided between the indicator bracket 2 and the upper spring beam to permit freedom of flexure of the spring beams. A sensitive dial indicator 4 having a rotatable bezel 5 for adjusting the dial position is securely fastened to the indicator bracket 2. A spring-loaded indicator spindle 6 perpendicular to the plane of the upper beam 1a of the load spring 1 rests firmly on a highly polished flat surface of a hardened steel button 7. The button 7 is threaded into the upper beam of the load spring for adjustment of height. The button and dial indicator are so arranged that the slightest flexure of the load spring due to compression will cause the dial indicator pointer to turn in a clockwise direction and thus indicate the compression on the dial. The lower beam 1b of the load spring 1 is apportioned to provide a flat surface 1c partially along the underside. The beam 1b also has a greater cross-sectional area than the upper beam 1a of the load spring, to maintain flatness of the lower beam when interposed between a plane surface or other means of applying load.

On the upper beam 1a and on the load axis of the load spring 1 a hardened steel button 17 with a ground and highly polished flat surface is threaded into a steel sleeve 18 which is press-fitted into a reamed hole in the load spring.

At the unslotted end of the load spring a rigid load apportioning beam 33 is hinged to the upper side by means of a hardened steel hinge pin 20 and a hinge block 35. The block 35 is securely fastened to the load spring by machine screws 34. The load apportioning beam 33 is dimensionally constructed for negligible deflection for maximum values of applied load, and is restricted from motion at quadrature to the normal motion provided by the hinge.

On the upper side of the load apportioning beam 33, and on the load axis of the load spring 1, a hardened steel button 36 is threaded into a hole in the beam. The upper face of the button 36 is provided with a polished ball-shaped convex center 42, and the threaded end, which extends through the load apportioning beam 33, is ground flat and dimensionally apportioned to rest firmly upon the flat surface of the hardened steel button 17 when the plane of the load apportioning beam 11 is parallel with the plane of the upper beam 1a of the load spring. Toward the unhinged end of the load apportioning beam 33, a steel load pin 38 having a knurled head 39 is threaded into one of several threaded holes 40 located on the longitudinal center and spaced from the load axis of the load spring to increase the sensitivity of the load spring and provide a multiple range of applied load values for indication on the dial of the dial indicator 4. Calibrated scales for each range of applied load may be provided directly on the dial, or a single arbitrary scale with equally spaced divisions may be provided to represent values of abscissa on separate cartesian graphs, the ordinates of which represent the values of applied loading for each range of load values.

On the load axis of the load spring 1, a hardened steel load pin 37 with a highly polished ball-type concave center 43 is press-fitted into and flush with the under surface 1c of the lower beam. A stop pin 41 is threaded into the longitudinal center of the upper beam of the load spring to limit the elastic deflection of the spring to that corresponding to the maximum value of load that may be applied.

By removing the load pin 38 from the load apportioning beam 33, applied loading will be directly along the load axis of the load spring. If the load pin 38 is inserted in a hole in the load apportioning beam 33 spaced equidistant with the hinge pin 20 from the load axis of the load spring and contacts the arm 1a thereby unloading the pin 36, the applied load will be equalized by the hinge pin 20 and the load pin 38, and balanced loading will result along the load axis of the load spring. If the load pin 38 is inserted in a hole in the load apportioning beam 33 that is not equidistant with the hinge pin 20 from the load axis of the load spring, the applied load will not be equalized, and the load on the load pin 38 will be in inverse ratio to the distance from the load pin 38 to the load axis of the load spring, hence the loading applied will not be balanced along the load axis of the load spring.

I have described, as the preferred embodiment of my invention, the construction of FIGS. 1 through 4 in which the load apportioning beam such as 19 or 33 is hinged to the support portion joining the spring beams 1a and 1b, while the load pin such as 25 or 38 is located on the end of the load apportioning beam extending toward the free end of the beam 1a. However, if desired, the load apportioning beam could be hinged to the free end of the beam 1a, essentially at the location of the load pin 25 in FIG. 1 or at the location of the outer threaded hole 40 in FIG. 4. The load pin locations would then be over the support portion of the load spring, and the interposer construction comprising the lever 26 and pins 25 and 31 of FIGS. 1 and 2 would, correspondingly, be located on the support portion.

Although I have shown and described specific embodiments of my invention for illustrative purposes, it is to be understood that the invention is not limited to the specific mechanical details described, for numerous modifications within the spirit of the invention will readily occur to one skilled in the art to which it pertains. Therefore, it is my intention that the limits of the invention be defined only by the appended claims.

Having thus disclosed my invention, what I claim as new and desire to secure by Letters Patent of the United States is:

1. A load measuring assembly, comprising a load spring including first and second resilient arms cantilevered in a support and extending in a first direction in spaced relation from ends fixed in said support to free ends, said arms being deflected toward each other by a load applied to the arms along a load axis which is normal to said first direction and lies in the plane formed by the two arms and which is intermediate the fixed and free ends of the arms, an equalizing beam having a first end pivoted to said load spring for rotation about a pivot axis normal to said first direction and to said load axis, said equalizing beam being rotatable to a position in which it extends from said first end along and adjacent to said first arm, said equalizing beam engaging said first arm at a point on said load axis in a first rotated position of said beam about said pivot axis, an interposer adjustably mounted between said equalizing beam and said first arm for movement between a first position, in which said equalizing beam is free to move to said first rotated position, and a second position, in which said equalizing beam engages said first arm through said interposer along a first application axis parallel to said load axis and on the opposite side of and farther from said pivot axis than said load axis, whereby a load applied between said equalizing beam and said second arm along said load axis is directly applied to said first arm along said load axis in the first position of said interposer, and in the second position of said interposer, is divided in its application to said load spring between a portion applied to said first arm along said first application axis and a portion applied to said load spring through the equalizing beam pivot, and a deflection indicator mounted between the free ends of said arms to indicate their relative deflection.

2. The apparatus of claim 1, in which the distance from said first application axis to said load axis is equal to the distance from said load axis to an axis parallel to said load axis and intersecting said pivot axis.

3. A load sensing assembly for a hardness testing machine, comprising a load spring including first and second resilient arms cantilevered in a supporting portion and extending in spaced relation along a first axis from ends fixed in said supporting portion to free ends, an indicator connected between the free ends of said arms to indicate their relative position, a beam adjacent said first arm and pivoted at one end to said load spring for rotation in a plane parallel to said arms and about a second axis normal to said plane, a first load pin mounted on said beam and adapted to contact said load spring in one rotated position of said beam, a second load pin mounted on said beam at a distance farther from the pivoted end of said beam than said first load pin and extending toward said load spring with clearance when said first load pin engages said load spring, and a manually operable lever adjustably mounted on said load spring for movement between a first position engaging said second load pin and preventing rotation of said beam to said one position and a second position clearing said second load pin and permitting rotation of said beam to said one position.

4. The apparatus of claim 3, in which said first load pin is equidistant from said second axis and said second load pin, and further comprising an extension shaft connected to said second arm and having a longitudinal axis normal to said first axis and said second axis and intersecting said first load pin, and means for mounting a hardness testing penetrator on said extension shaft.

5. Load measuring apparatus, comprising a load spring, said load spring comprising first and second resilient beams and support means connecting said beams together at first ends thereof, said beams extending along a first axis in spaced confronting relationship to second free ends for deflection toward each other in response to a load applied across the beams intermediate their ends, a load being applicable to said apparatus along a load axis normal to said first axis and intersecting said beams, an equalizing beam pivoted at one end to said load spring for rotation in the plane of said first and second beams and about a third axis normal to said first axis and said load axis and spaced from said load axis by a predetermined distance along said first axis, said equalizing beam extending along said first beam and having one end spaced therefrom over an arc of rotation about said third axis, first load applying means mounted between said first beam and said equalizing beam in position to contact said first beam at a first point intermediate its ends when said equalizing beam is pivoted to a first position, second load applying means mounted on said equalizing beam in position to contact said load spring at a second point were said equalizing beam to be pivoted beyond said first position, said first point being intermediate said load axis and said second point, interposer means adjustably mounted between said load spring and said equalizing beam for movement between a first position in which said equalizing beam can be rotated to its first position and a second position in which said interposer means engages said second load applying means and said load spring with said first load applying means clear of said load spring, and indicating means connected between the free ends of said first and second beams to indicate their relative deflection.

6. A load sensing assembly for a hardness testing machine, comprising a load spring including first and second resilient beams cantilevered in a supporting portion and extending in spaced relation along a first axis from ends fixed in said supporting portion to free ends, an indicator connected between the free ends of said beams to indicate their relative position, a third beam pivoted at one end to said supporting portion for rotation about a second axis normal to said first axis and to the plane formed by said arms, a first load pin mounted on said third beam and adapted to contact said first beam in one rotated position of said third beam, a second pin mounted on said third beam at a distance farther from the pivoted end of said third beam than said first load pin and extending toward said first beam with clearance when said first load pin engages said first beam, and a manually operable lever adjustably mounted on said first beam for movement between a first position engaging said second load pin and preventing rotation of said third beam to said one position and a second position clearing said second load pin.

7. The apparatus of claim 6, in which said first load pin is equidistant from said second axis and said second load pin, and further comprising an extension shaft connected to said second beam and having a longitudinal axis normal to said first axis and said second axis and intersecting said first load pin, and means for mounting a hardness testing penetrator on said extension shaft.

8. Load measuring apparatus, comprising first and second resilient beams, support means connecting said beams together at first ends thereof, said beams extending along a first axis in spaced confronting relationship to second free ends for deflection toward each other in response to a load applied across the beams intermediate their ends normal to said first axis and intersecting said beams, an equalizing beam pivoted at one end to said support means for rotation about a second axis normal to the plane formed by said resilient beams, said equalizing beam extending along said first beam and spaced therefrom over an arc of rotation about said second axis, first load applying means mounted between said first beam and said equalizing beam in position to contact said first beam at a first point intermediate its ends when equalizing beam is pivoted to a first position, second load applying means mounted on said equalizing beam at a second point in position to contact said first beam at a second point intermediate its ends were said equalizing beam to be pivoted beyond said first position, said first point being intermediate said second axis and said second point, interposer means adjustably mounted between said first beam and said equalizing beam for movement between a first position in which said equalizing beam can be rotated to its first position and a second position in which said interposer means engages said second load applying means and said first beam with said first load applying means clear of said first beam, and indicating means connected between the free ends of said first and second beams to indicate their relative deflection.

References Cited

UNITED STATES PATENTS 3,128,621   4/1964   Scott _____ 73—81

RICHARD C. QUEISSER, Primary Examiner

E. J. KOCH, Assistant Examiner

U.S. Cl. X.R.

73—83; 177—229, 230